United States Patent
Stucker

(10) Patent No.: US 10,838,087 B2
(45) Date of Patent: Nov. 17, 2020

(54) METHOD AND APPARATUS FOR REAL-TIME MEASUREMENT OF FISSILE CONTENT WITHIN CHEMICAL AND MATERIAL HANDLING PROCESSES

(71) Applicant: WESTINGHOUSE ELECTRIC COMPANY LLC, Cranberry Township, PA (US)

(72) Inventor: David L. Stucker, Chapin, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 147 days.

(21) Appl. No.: 16/227,426

(22) Filed: Dec. 20, 2018

(65) Prior Publication Data

US 2020/0200926 A1    Jun. 25, 2020

(51) Int. Cl.
  *G01T 1/40* (2006.01)
  *G01T 1/20* (2006.01)
  *G21G 1/10* (2006.01)

(52) U.S. Cl.
  CPC ............ *G01T 1/40* (2013.01); *G21G 1/10* (2013.01); *G01T 1/20* (2013.01)

(58) Field of Classification Search
  CPC .............. G01T 1/20; G01T 1/40; G21G 1/10
  See application file for complete search history.

(56) References Cited

U.S. PATENT DOCUMENTS

| | | | |
|---|---|---|---|
| 2003/0179843 A1* | 9/2003 | Bernardin | G21G 1/02 376/194 |
| 2010/0061500 A1* | 3/2010 | Lou | G21G 4/02 376/114 |
| 2011/0194662 A1* | 8/2011 | Nolen, Jr. | G21G 1/10 376/190 |
| 2013/0142296 A1* | 6/2013 | Piefer | G21K 5/08 376/190 |

OTHER PUBLICATIONS

K.R. Elam, Emplacement Guidance for Criticality Safety in Low-Level-Waste Disposal, U.S. Nuclear Regulatory Commission Office of Nuclear Material Safety and Safeguards, Jun. 16, 1999.
Neutron Detection and Counting, Mirion Technologies, Canberra, Oct. 2010.
B. Pedersen, Pulsed Neutron Interrogation Test Assembly—PUNITA, Institute for Transuranium elements—ITU Joint Research Centre, Presentation, May 12, 2016.

(Continued)

*Primary Examiner* — Mark R Gaworecki
(74) *Attorney, Agent, or Firm* — K&L Gates LLP

(57) ABSTRACT

An apparatus and method are described which enable real time measurements to measure the margin to criticality in a process for manufacturing fissile materials. An exemplary apparatus includes a neutron source capable of being modulated, an optional moderator to reduce the thermal energy of neutrons from the neutron source, a collimator for controlling the direction of any neutrons emanating in use from the target, a plurality of detector arrays positioned in predetermined locations relative to a process vessel for detecting process variables and for sending signals representative of (Continued)

the process variables in real time to a processor for receiving the signals and converting the detected process variables into margin to criticality measurements.

31 Claims, 1 Drawing Sheet

(56) References Cited

OTHER PUBLICATIONS

Basic Physics of Nuclear Medicine/Scintillation Detectors, https://en.wikibooks.org/wiki/Basic_Physics_of_Nuclear_Medicine/Scintillation_Detectors, edited Feb. 25, 2018.
P. E. Vanier, Thermal neutron imaging in an active interrogation environment; Nonproliferation and National Security Department, Brookhaven National Laboratory, Upton, NY, Jul. 2009.

* cited by examiner

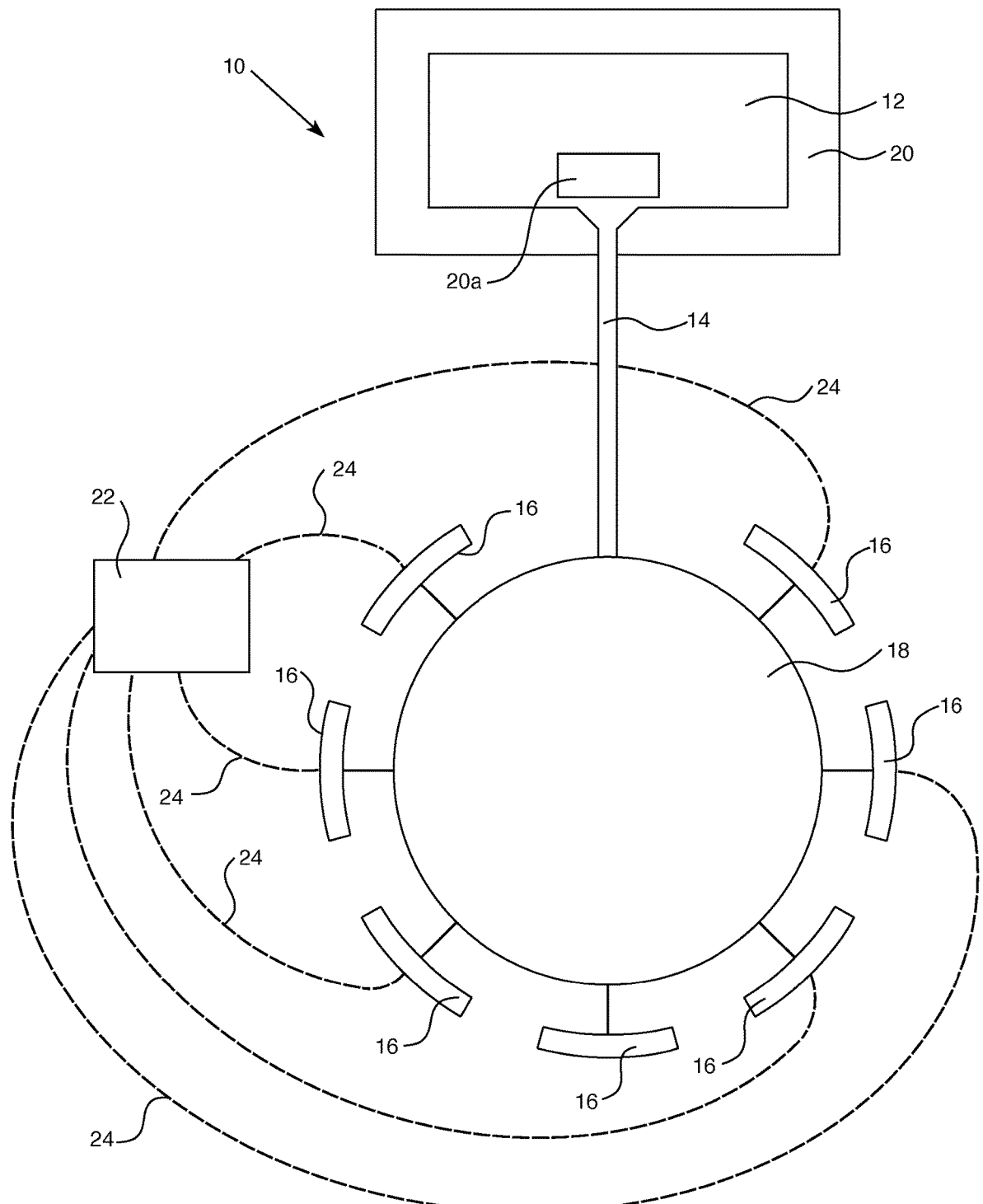

METHOD AND APPARATUS FOR REAL-TIME MEASUREMENT OF FISSILE CONTENT WITHIN CHEMICAL AND MATERIAL HANDLING PROCESSES

BACKGROUND OF THE INVENTION

1. Field of the Invention

The invention relates to detection methods and devices and more particularly to methods and devices for detecting the fissile content of materials within a manufacturing process in near real time.

2. Description of the Prior Art

In processes for manufacturing materials containing special nuclear material (SNM), such as uranium enriched in the $^{235}$U isotope above the naturally occurring concentration of 0.711 weight percent $^{235}$U, as well as processes containing $^{233}$U or and plutonium, special handling and process design are required to avoid creating a situation in which the process material supports a self-sustaining chain reaction of fissions, otherwise known in the nuclear art as reaching criticality. Criticality occurs when there is a balance between neutron production and neutron loss in a chain reaction of fission events. In a nuclear reactor, the object is to achieve criticality so that the production of nuclear energy is self-sustaining. It is well known that outside of the well contained and purposefully designed environment of a nuclear reactor, criticality is to be avoided because of the dangers of nuclear radiation exposure and contamination. This is particularly true in the manufacture of and disposal of fissile material. Safe processing of special nuclear materials in a fuel manufacturing setting requires that any production of neutrons be much less than the losses of neutrons in a configuration known in the nuclear art as subcritical. A safely subcritical condition is characterized as having the neutron losses much greater than production. It follows that in this safely shutdown condition, the neutron population in the process will be very small and generally below measurement thresholds. Unfortunately, a safely subcritical configuration is difficult to differentiate from an unsafe, but still slightly subcritical configuration because both will not produce significant neutrons or other radiation until the configuration is critical and then actually supercritical, where neutron production exceeds losses. A supercritical configuration will result in significant nuclear hazard and contamination and is, therefore, to be avoided at all cost outside the purpose designed confines of a nuclear reactor.

Heretofore, there has been no practical way to measure or detect the fissile content of a process in near real time so as to be able to measure the actual level of subcriticality because the neutron production and losses in a near zero neutron population are also nearly zero. To compensate for the lack of real time information about the actual levels of neutron production and loss, current art manufacturing facilities utilize off-line criticality safety analyses and extensive off-line laboratory analysis based on assumptions that the multiple key inputs to a process are in the most conservative configuration regardless of whether the assumptions are possible in reality or in coincidence. Engineers create models of the geometry of the process equipment, such as pipes, containers, columns, pumps, valves, centrifuges, and similar vessels, and model the process chemistry and physics, and system and process controls, imagining the worst case scenarios and faults in the process and equipment. These assumptions result in significant impacts on process operability due to the conservative nature of the criticality assumptions as well as real physical limitations on process dimensions and layout that negatively impact operability and maintainability.

SUMMARY OF THE INVENTION

The following summary is provided to facilitate an understanding of some of the innovative features unique to the embodiments disclosed and is not intended to be a full description. A full appreciation of the various aspects of the embodiments can be gained by taking the entire specification, claims, and abstract as a whole.

In various aspects, an apparatus is described herein that measures the fissile content in a process for manufacturing fissile materials wherein the process uses a process vessel. The apparatus includes a neutron generating assembly for generating neutrons, a collimating assembly for focusing the neutrons generated in the neutron generating assembly towards the process vessel, an interrogation assembly positioned in predetermined locations relative to the process vessel for detecting variables of the process, wherein the variables include in use, at least neutron and gamma radiation content or absence thereof, and a processor for receiving input about the process variables from the interrogation assembly and for calculating margin to criticality in the process based on the detected variables. In certain aspects, the neutron generating is one of either a fusion neutron source capable of being modulated electronically or a fixed neutron source capable of being modulated mechanically. In certain aspects, the neutron source is an accelerator-driven fusion source utilizing either deuterium-deuterium (D-D) or deuterium tritium (D-T) hydrogen fusion reactions. In other certain aspects, the neutron source is a fixed source of material that decays by neutron production, such as $^{252}$Cf. In certain aspects, the neutron emitting material may be selected from a group consisting of $^{252}$Cf as a spontaneous fission source and (α,n) neutron sources consisting of mixtures of beryllium and mixtures of highly active α particle emitters of plutonium, americium, radium and polonium.

The fusion neutron source may include an ion-beam target made of a material that readily adsorbs hydrogen isotopes within the crystal lattice. Exemplary materials for the ion-beam target include zirconium, titanium, yttrium, and palladium and combinations thereof. The fusion neutron may also use heavy water or high pressure deuterium or tritium gas as the target material. The choice of fusion neutron source target material is optimized for each application.

In various aspects, the neutron source pulses an ion beam, comprised for example of one of deuterium and tritium ions, towards the target. The deuterium or tritium embedded in the target absorbs the deuterium or tritium ion beam, undergoes a nuclear fusion reaction and releases neutrons to the collimating assembly.

The interrogation assembly may include a plurality of detector arrays positioned in predetermined locations relative to the process vessel. The detectors are preferably selected from the group consisting of neutron and gamma detectors.

The interrogation assembly may also detect process variables such as process parameters selected from the group consisting of temperature, pressure, pH, flow rate, density, fluid level, opacity, moisture, and combinations thereof. The interrogation assembly may also include a moderator assembly surrounding the detector array(s) for thermally equalizing neutrons generated in the process as a result of the neutrons produced in the neutron generating assembly. The interrogation assembly moderator may be made of a material having an atomic number of 12 or less. Exemplary materials include water, heavy water, beryllium, beryllium oxide, graphite, polyethylene, deuterated polyethylene, metal hydrides, metal deuterides and combinations thereof.

The processor input may include signals from the interrogation assembly representative of the process variables in real time. The processor correlates the signals to stored models of known process variables to calculate margin to criticality.

The apparatus may also include a moderator assembly positioned between the neutron generating assembly and the collimating assembly for thermally equalizing neutrons generated in the neutron generating assembly. The moderator may be made of a material having an atomic number of 12 or less. Exemplary materials include water, heavy water, beryllium, beryllium oxide, graphite, polyethylene, deuterated polyethylene, metal hydrides, metal deuterides and combinations thereof.

The apparatus may be described as having generally a neutron source capable of being modulated, a collimator for focusing the direction of neutrons emanating in use from the neutron generator, a plurality of detector arrays positioned in predetermined locations relative to the process vessel for detecting process variables comprising at least neutron and gamma radiation wherein the detectors produce signals representative of the process variables in real time, and a processor for receiving the signals and converting the detected process variables into margin to criticality measurements.

The neutron source may vary. For example, the neutron source may be a fixed source, a fusion source using a liquid target, or a fusion source using a target formed from a material capable of taking hydrogen into solution, the target being impregnated with deuterium.

The processor input may be in the form of measured detector signals from the interrogation assembly representative of the process variables in real time. The processor correlates the signals to stored models of known process variables to calculate margin to criticality. In various embodiments, other salient aspects of the process, including but not limited to temperature, pressure, pH, flow rate, density, fluid level, opacity, moisture, may be measured and communicated to the processor.

In various aspects, a method is described herein for measuring a margin to criticality in a process for manufacturing fissile materials wherein the process uses process vessel. The method generally includes pulsing neutrons from a source of neutrons, collimating the pulsed neutrons into the process vessel which is, in turn, being viewed by an array of process variable detectors positioned in predetermined locations relative to the process vessel, detecting process variables comprised of at least neutron and gamma radiation levels, wherein the detectors produce signals representative of the process variables in real time, and sending the real time signals to a processor wherein the processor correlates the signals to stored models of known process variables to calculate margin to criticality.

The method may also include moderating the thermal equilibrium of neutrons pulsed from the neutron source before collimating the neutrons.

The step of pulsing the neutrons may include intermittently generating an ion beam comprised of either deuterium or tritium and directing the beam to a target formed from a material capable of taking hydrogen isotopes into solution. The target is preferably impregnated with either deuterium or tritium and emits neutrons upon absorption of the deuterium or tritium ions.

Alternatively the neutron pulses may be formed from a fixed neutron source through the use of mechanical shutters or shields.

The apparatus and method described herein enable real time measurement of the fissile content of chemical and material handling processes. This capability will enable a step-change in processing capability both by providing real-time feedback of the process fissile content as well as the verification of the criticality safety of the process. In various aspects, the apparatus utilizes a pulsed neutron generator placed in close proximity to the fissile material manufacturing process to be measured combined with one or more process-coupled neutron and gamma radiation detectors to measure fission rate, neutron multiplication and delayed fissions neutrons which are coupled to a processor that utilizes the pre-calculated results of well-known Monte Carlo computer codes such as MCNP, KENO or equivalent to determine the fissile content within the process and, thereby margin to criticality.

The transfer function from neutron pulse and detector response may be determined by solving the neutron transport Boltzmann equations for the response within the interrogator assembly due to the introduction of the neutron source from the neutron generator within the process vessel. The solution of the Boltzmann equations using Monte Carlo method is well known to those skilled in the nuclear energy field. Commercially available computer codes such as MCNP, KENO or their equivalents are used by describing the specific geometry and materials of the neutron generator, the process being measured and the interrogator assembly. The Monte Carlo computer code tracks source neutrons from birth in the source assembly through their transit of the source assembly, moderator and collimator, into the process and then into the interrogator assembly through death from absorption or leakage. The neutron pulse strength and pulse width will be optimized to each process for which this invention is applied to provide the required measurement accuracy while minimizing the irradiation of the process fissile material as well as the personnel dose resulting from the measurement technique.

The novel use of pulsed neutron sources, such as neutron generator tubes or accelerators, combined with use of response surface functions that are generated specifically for the specific process item using the criticality safety methods calculation of fixed source response and the novel use of Monte Carlo computing calculations in a fixed source to provide real time process control and safety parameter measurement will significantly increase the safety and economy of manufacturing fissile materials.

BRIEF DESCRIPTION OF THE DRAWINGS

The characteristics and advantages of the present disclosure may be better understood by reference to the accompanying figures.

The FIGURE is a schematic representation of an embodiment of the apparatus used with a process vessel.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

The various embodiments of the apparatus and method described herein enable online monitoring of the fissile content of the special nuclear material (SNM) moving through a nuclear fuel production process. In general, the apparatus includes a neutron generating assembly for generating neutrons, a collimating assembly for focusing the neutrons generated in the neutron generating assembly towards the process vessel, an interrogation assembly positioned in predetermined locations relative to the process vessel for detecting variables of the process, the variables comprised in use of at least the neutron and gamma radiation content or absence thereof, and a processor for receiving input about the process variables from the interrogation assembly and for calculating margin to criticality in the process based on the detected variables.

"Process vessel," as used herein refers to any of the various containers, pipes, pumps, centrifuges, kilns, vessels and the like used in the manufacture and processing of SNM to make nuclear fuel.

In a fuel manufacturing process, typically cylinders of $UF_6$ are received and vapors of $UF_6$ are used in the process to convert the $UF_6$ to another chemical form of uranium such as uranium dioxide ($UO_2$), triuranium octoxide ($U_3O_8$), uranium tetrafluoride ($UF_4$), uranium silicide ($U_3Si_2$), uranium carbide (UC), uranium nitride (UN) and metallic uranium. Similar chemical forms are also produced in a facility processing plutonium instead of uranium. At any the point in the process, the assumption is that small fission reactions that produce neutrons can occur and that the neutron production could increase should the process approach or reach criticality. Every fission event creates a cascade of radiation events that produce neutrons and gamma radiation. For safety purposes, there must be enough of a margin between the occasional neutron production during processing in a process that is safely subcritical on one hand and an intense pulse of neutron production followed by a steady state fission rate that would result from a process that is inadvertently allow to achieve criticality. It is the consequence of the intense pulse of radiation and the follow on steady radiation that requires that a criticality event be avoided at the prime directive of nuclear safety.

As used herein, "margin to criticality" shall mean the difference between a perceived safe level where there is substantially less neutron production than neutron loss in the process when compared to the process critical condition in which neutron production and neutron loss are equal and there is a steady state of intense radiation as a result. In the nuclear art, the condition describing the critical condition is defined as the effective multiplication factor for the process, $K_{eff}$, being exactly unity, or in equation form, $K_{eff}=1.00$ . . . . In order to assure that a process handling special nuclear materials is safe and appropriately designed, the process must be subcritical, or expressed as $K_{eff}<1$ under all potentially conceivable conditions. In practice, the effective multiplication factor should be significantly less than one, designated $K_{eff}\ll 1$, not only to preclude an actual criticality event, but also to provide a margin of safety to provide assurance that the unthinkable event cannot occur without a series of failures that all owner, public and regulatory stakeholders are confident cannot occur. Determining the margin of safety in the design and safety analyses necessary to obtain licenses to operate a process containing special nuclear material is generally codified by international regulation and industry standards.

The method described herein may be generally described as a method for measuring a margin to criticality in a process for manufacturing fissile materials wherein the process uses process vessel. The method generally includes pulsing neutrons from a source of neutrons, collimating the pulsed neutrons towards an array of process variable detectors positioned in predetermined locations relative to the process vessel, detecting process variables comprised of at least neutron and gamma radiation levels, wherein the detectors produce signals representative of the process variables in real time, and sending the real time signals to a processor wherein the processor correlates the signals to stored models of known process variables to calculate margin to criticality.

The method may also include moderating the thermal equilibrium of neutrons pulsed from the neutron source before collimating the neutrons.

The method of creating neutron pulses may include intermittently generating an ion beam within a fusion neutron generator or by opening and closing a shutter in a fixed neutron source neutron generator.

The method described above may, in various aspects be carried out in the apparatus described herein. Referring to the FIGURE, an exemplary embodiment of the apparatus 10 may include a neutron generator 12, a collimator 14, a series of detector arrays 16 positioned at selected locations adjacent or in close proximity to, or contact with various process vessel, represented schematically by process vessel 18. The detector arrays 16 produce signals 24 representative of process variables and communicate the signals 24 to a processor 22. In certain aspects, the apparatus 10 may also include a moderator block 20 shown in dashed lines between the neutron generator 12 and collimator 14 or may be contained within a moderator 20a. The details and function of each feature of the apparatus 10 is described below.

The neutron generating assembly is, in general, a commercially available apparatus designed to create hydrogen fusion reactions by impinging high energy deuterium ions into a medium containing deuterium or tritium referred to as a target. The use of an ion beam enables the neutron source capable of being modulated from full on to full off and all points between which is a key matter of safety when utilizing and apparatus that generates neutrons. Depending upon the configuration, the neutron generator may use a solid, liquid or gaseous target. Examples of a solid target include metals that are well-known to adsorb hydrogen into their crystal structure including, but not limited to, zirconium, titanium, yttrium, lithium, palladium to name a few. A typical liquid target would be comprised of deuterium oxide (heavy water) for a deuterium target or tritium oxide for a tritium target. A gas target would consist of deuterium or tritium gas. An alternate embodiment of the neutron generating assembly would be one in which a fixed source of neutron generating material including, but not limited to $^{252}Cf$ is contained and shielded within the neutron generating assembly and modulation is obtained by mechanical means through the use of a shutter or other similar device to enable and disable the flow of neutrons from the neutron generating assembly. In various aspects, the neutron emitting material may be selected from a group consisting of $^{252}Cf$ as a spontaneous fission source and (α,n) neutron sources consisting of mixtures of beryllium and mixtures of highly active α particle emitters of plutonium, americium, radium and polonium.

In the preferred embodiment of the neutron generator using an accelerator-driven fusion reaction, the accelerator pulses the ion beam comprised for example of one of deuterium and tritium ions, towards the target. The target absorbs the ions from the ion beam and releases neutrons as a result of undergoing a fusion reaction to the collimating assembly. In the alternate embodiment of the neutron generator using a fixed neutron source, a mechanical shutter or window alternately exposes and shields the source neutrons from leaving the neutron generator assembly. The preferred embodiment of the neutron generator assembly moderator will utilize a moderator made of a material having an atomic number of 12 or less. Exemplary materials include water, heavy water, beryllium, beryllium oxide, graphite, polyethylene, deuterated polyethylene, metal hydrides, metal deuterides and combinations thereof. Those skilled in the art will recognize that the moderator assembly will necessarily be of a different design for each type of neutron source. By way of example, the fusion sources result in monoenergetic 2.2 MeV and 14.7 MeV for D-D and D-T, respectively. A $^{252}Cf$ source emits a fission energy spectrum source with most probable energy at ~2.7 MeV.

The neutron generating assembly used in the apparatus may, for example, be a neutron source capable of being modulated. Examples of neutron sources include neutron generating tubes and fixed neutron sources. A neutron generator 12 typically consists of a neutron tube and a power supply. Neutron tubes include an ion source, an accelerator and a target, all housed in a suitable container. The neutron generator 12 can be modulated, or turned on and off at desired times or at a desired pace. In the method described herein, the neutron generator 12 may be pulsed to release pulses of neutrons into the collimator assembly and towards the process vessel 18 and detector assembly.

The neutron generator tube contains materials such as molybdenum, rare earth metals, alumina ceramics, and blends thereof, and importantly, one or both of tritium (T) or deuterium (D). Inside the neutron generator tube, the ion beam material of either deuterium or tritium is ionized and electrostatically accelerated toward the target which has been infused with either deuterium or tritium. The fusion neutron generators using tritium as one of the fusion reactants have limited shelf life due to decay of tritium on a approximately 12 year half-life. The target is formed from a material capable of taking hydrogen into solution and has either deuterium (D) or tritium (T) embedded in a metal matrix. Exemplary target materials include zirconium (Zr), Yttrium (Y), and iridium (Ir). The ion beam strikes the target and the deuterium or tritium from the beam may be absorbed by the deuterium or tritium in the target causing a nuclear fusion reaction. The fusion reaction results in the generation of neutrons that are released within the neutron generator. Neutron generators are known in the art and are commercially available.

In various aspects, a preferred embodiment may utilize commercially available neutron generator tubes that typically consist of a deuterium ion source that is electrostatically accelerated and impinged on a target that has been impregnated with either deuterium or tritium. The accelerated deuterium ion undergoes a fusion reaction with the deuterium or tritium in the target resulting in the emission of a 2.2 MeV neutron in the case of D-D fusion or a 14.7 MeV neutron in the case of D-T fusion.

The collimating assembly may for example, include a series of shields or a collimator 14 that directs or focuses the neutrons emitted from the neutron generating assembly towards the desired process vessel. Collimators are known, commercially available devices, which, as used herein, focus the neutrons into a particle beam in which the particle paths are exiting the collimator are substantially parallel. The collimator 14 may be, in various aspects, an arrangement of absorbers for limiting the beam of neutrons to the dimensions and angular spread required for the specific manufacturing process application.

The interrogation assembly, in various aspects includes one or more detectors, and preferably a plurality of detector arrays 16 positioned between and around the collimator assembly and the process vessel 18. The detector arrays 16 are, for example, positioned in predetermined locations relative to the process vessel 18 from which fissile content and subcriticality margin are being measured. The detectors 16 in certain aspects may be selected from the group consisting of ion chambers, proportional counters and/or scintillator detectors. In addition to the detection of process neutron emission, the interrogator assembly will also measure the emission of gamma rays that result from the decay of fission products resulting from fission products produced by the pulse of neutrons from the neutron generator.

The detector arrays 16 measure the neutron multiplication, neutron and fission gammas generated and released in all directions as a result of the neutron source pulses. The detector arrays may be placed in multiple locations on or around the process vessel where fission events are most likely to occur. The exact number and location for placement of the detector arrays will vary according to the specific fissile material production process used, the type, size and geometry of the process vessel used, cost considerations, the anticipated strength of fission reactions in a particular portion or stage of the process, and required measurement accuracy for any portion or stage of the process. Placement of the detector arrays should, in most cases, be as close to the process as possible without interfering in the process. For example, detectors may be mounted circumferentially around and preferably in operative contact with a pipe or a container.

By "operative contact" it is anticipated that the contact, although not physical, is not distinguished from direct contact such that the detector can effectively measure a process variable to effectively the same degree as if the detector were in physical contact with the process or process vessel, or sufficiently close to that degree that the process variable being measured will not materially alter the calculations of margin to criticality. Detectors may, for example, be packed closely or loosely around the process vessel depending on the design of the detector and the desired measurement accuracy. It would not be unusual for detectors to be placed every 20, 30, 45, or 60 degrees around the vessel on one or more planes running perpendicular to the longitudinal axis of the pipe or other vessel, and/or along one or more planes at an angle relative to the longitudinal axis of the pipe or other vessel. In various aspects, the placement of a detector array will be at the location(s) among the process vessel(s) or at select process vessel that is most limiting for reaching criticality. For example, placement of a detector array within an individual flow path would be placed at a large diameter tank rather than along a thin pipe run because with the same process fluid, margin to critical is minimized by large dimensions that concentrate fissile material mass. The requirement of the design and safety analysis is to assure that the process is always well below a self-sustaining fission event where $K_{eff}=1$. For a workable margin of criticality, $K_{eff}$ should be substantially less than one ($K_{eff}<<<1$.)

Exemplary detectors include, for example, ion chambers, fission chambers, proportional counters and scintillators. Those skilled in the art will recognize that there are other detectors that may be used and that the precise detector will depend on the process variables one wishes to measure, which in turn will depend on the nature of the chemistry and physics of the manufacturing process used. Detectors are generally commercially available. In a detector array, the multiple detectors are of generally similar design are arranged physically around the process and then electronically connected to enable a more encompassing view of the process variables at any given time and at desired locations in the process. Detectors positioning may also be used to measure specific types of radiation that occur at in opposite directions, in coincidence counting mode, where a count is made only if two opposing detectors register an event of the correct energy within a very brief time window (<~1 picosecond). Coincidence counting is a powerful tool to improve the detector signal-to-noise ratio by measuring specific types of reactions, such as fission directly while rejecting the resulting fission product decay gammas. Exemplary process variables include pressure, temperature, flow rate, density, fluid level, pH, moisture, neutron count rate, neutron energy, gamma count rate, gamma energy.

The detector arrays will take readings at any desired frequency, again depending on the nature of the process, the process vessel configuration, the strength of the source and the desired accuracy. For example, the readings, or measures of process variables in the interrogation process may be taken every 5-7 seconds in a process with a typical time constant of 1 minute. However, if there is a particular process vessel where changes are infrequent, the frequency of the interrogation, or measurement taking, may be only when there are changes to the process vessel configuration, e.g., filling, draining or stirring, or every few minutes or even less frequently. With each interrogation or measurement, a known pulse of neutrons from the neutron source is introduced into the process. The more frequent the interrogation, or the larger the pulse of neutrons, the more accurate the measurement of the process parameters because the accuracy of the measurement is proportional to the inverse of the square roots of the number of counts. It is also true that an increase in the pulse size or frequency linearly increases the product irradiation and therefore the source strength for personnel radiation dose who physically approach the process. There is therefore, a balance between the desire to accurately know what is happening in the process and the need to minimize radiation added to the process system. The optimal frequency of interrogation will depend on the process variables, the specific manufacturing process used, process vessel geometry and material make-up and other factors understood by those skilled in the art of nuclear material production and criticality avoidance. In some portions or stages of the process, it may be important to have frequent measures of the process variables, while in other portions or stages, less frequent interrogation will be sufficient. In other portions of the process, the cost and dose associated with automated interrogation may not be justified at all, in which case these processes will continue to use bounding, off-line safety analysis to demonstrate safety.

The detector readings of process variables generate signals 24 representative of the process variables in real time that are sent to and received by a processor 22. The processor 22 receives the input about the process variables from the interrogation assembly. In various aspects, the processor 22 input is in the form of measured detector signals 24 from the interrogation assembly, and may additionally include other salient measured aspects of the process including but not limited to temperature, pressure, pH, flow rate, density, fluid level, opacity, moisture, and combinations thereof representative of the process variables in real time. The processor 22 correlates the signals to stored models of known process variables to calculate margin to criticality.

The processor correlates the signals to stored models of known process variables to calculate margin to criticality. The processor 22 and detector arrays 16 may communicate through any suitable known wired or wireless connection. Monte Carlo computer code models are created of the known neutron generator, including any moderator and collimator, the known materials of the process vessel, known positions of the various process vessel for the specific manufacturing process or processes of the specific special nuclear material or materials that will be carried out in a given manufacturing facility. A complete range of materials of construction and possible process scenarios for all process starting materials and intermediates to the final fissile material is modeled. A design of experiment is devised to provide guidance for the calculation of the combination of the known features and possible scenarios to determine theoretical fission rates for each and what any given detector is expected to detect for each process variable. For example, the fission rate for a given neutron pulse strength at a particular location or stage in the process would be measured and provided to the processor, combined with the other process variables and processed through the algorithm to arrive at the margin to criticality. The neutron generator pulses neutrons into the process stream containing the special nuclear material and measures the neutron multiplication, neutrons and fission gamma generated as a result of the neutron pulse(s).

The process multiplication and/or fission gammas will used by online processing software to convert the measured detector response(s) into margin to criticality using the measured subcritical multiplication using a response surface calculated with a series of fixed source responses to the key process variables using the same Monte Carlo computer code set used to demonstrate the criticality safety of the specific process with its associated geometric and material configurations.

The method is well known and is useful for obtaining numerical solutions to problems which are too complicated to solve analytically. It was named by S. Ulam, who in 1946 became the first mathematician to dignify this approach with a name. A Monte Carlo method is a statistical method of understanding complex physical or mathematical systems by using randomly generated numbers as input into those systems to generate a range of solutions. The likelihood of a particular solution can be found by dividing the number of times that solution was generated by the total number of trials. By using larger and larger numbers of trials, the likelihood of the solutions can be determined more and more accurately. The Monte Carlo method is used in a wide range of subjects, including mathematics, physics, biology, engineering, and finance, and in problems in which determining an analytic solution would be too time consuming.

In 1946, Stanislaw Ulam applied the Monte Carlo approach to problems such as the production and diffusion of neutrons in radioactive material, a problem in which at each step there were so many possibilities that a solution was impossible to calculate. Ulam and John von Neumann worked out the method in greater detail. Today, there are commercially available software packages that apply a Monte Carlo method and any skilled software engineer or programmer can create a Monte Carlo based program for particular applications. The apparatus described herein is believed to be the first to couple the real time detection of fission events in a process with stored models developed using Monte Carlo methods for comparison to theoretical consequences of fission events under a full range of circumstances encountered in a fissile material manufacturing process. The response surface will provide direct measurement of the key process variables, e.g., fissile content, uranium content, moisture, and process material level using the neutron and gamma measurements from the interrogation system and the global parameters of pressure, temperature, flow rate, pH, and the like. The strength and frequency of the neutron pulses will be optimized to minimize personnel dose while providing the required process control and safety-related information at the required frequency.

In various aspects, the apparatus 10 may also include a moderating assembly 20, 20a positioned between the process vessel 18 and the interrogation assembly. The moderating assembly 20, 20a may be made of material of atomic number of 12 or less. Exemplary materials for the moderator include water, heavy water, beryllium, beryllium oxide, graphite, polyethylene, deuterated polyethylene, metal hydrides, metal deuterides and combinations thereof. Thermal neutrons are produced by exposing the high energy neutrons produced in the process to these well-known materials. The use of a thermalizing interrogator assembly will increase the sensitivity of the interrogation of the process but also will increase the physical size of the assembly which may or may not be acceptable to the overall process system design and functionality. The moderator assembly may be in the form of a block 20a positioned between the neutron generator 12 and the collimator 14. Alternatively, the moderator may for an enclosure 20 surrounding and functioning as a housing for the neutron generator 12. In either configuration, the thermal energy from the neutrons emitted from the neutron generator is reduced by the moderator assembly. The moderator slows down the neutrons without absorbing so many that there are not enough neutrons emitted from the moderator to reach the detector array 16 and the process vessel 18.

In various aspects, in an embodiment which may be referred to as thermal interrogation, the neutron generator is located within a specifically designed moderator block 20 made of a material with good moderating properties as described above. The moderator assembly surrounding the neutron generator is shielded in all directions except that facing the SNM process to be interrogated for SNM concentration. The presence of the neutron generator assembly, the moderator assembly and the collimator assembly is included into the criticality evaluation of the process and the response function of the SNM process to source neutron interrogation. The advantage of thermal neutron interrogation is that the response of the SNM process is relatively large per source neutron due to the much higher fission cross sections for neutrons in the thermal energy spectrum but it also requires that the neutron generator moderator assembly be in close proximity to the process thereby reducing the process criticality margin.

As stated, the moderator is made of a material having a low atomic number. Graphite, having an atomic number of 12, is generally considered to most massive and still practical and effective moderator material. The next four more massive elements (nitrogen, oxygen, fluorine and neon) are all gaseous at room temperatures that limits the practicality of getting significant number densities of these elements to serve as moderators due to the inherently low mass density associated with gasses. Exemplary materials include but are not limited to the group containing water, heavy water, beryllium, beryllium oxide, graphite, polyethylene, deuterated polyethylene, metal hydrides, metal deuterides, and combinations thereof. The chosen materials will depend on certain process variables. For example, if the process temperature is high, polyethylene or water would not be used because the polyethylene may melt and the water will be converted to steam. In that case, metal hydrides, beryllium, beryllium oxide or graphite would be a better choice for the moderator material. In certain applications, for example where the available space for the apparatus is limited, a deuterated polyethylene moderator may be considered.

In some applications, the process itself may be carried out in an aqueous solution. In various aspects, the water in solution will be sufficient to thermally moderate the neutrons so a separate moderator would not be necessary. In other applications, the expected process conditions provide little, if any, moderation of the neutron energy. In such systems, referred to as fast interrogation systems, the neutrons are directed to the SNM process in a fast or intermediate spectrum.

The thermal interrogator embodiment with the moderator assembly may be contrasted to the first embodiment described that does not include a moderator. In the embodiment without a moderator, the method used may be referred to as fast interrogation method wherein there is little or no moderation of the thermal energy of the process source neutrons. As described above, the neutron source neutrons are directed into the SNM process in a fast or intermediate spectrum. The source assembly surrounding the neutron generator is collimated toward the SNM process, or shielded in all directions except that facing the SNM process, to be interrogated for SNM concentration. The presence of the neutron generator assembly and the assembly shielding is included into the criticality evaluation of the process and the response function of the SNM process to source neutron interrogation. The response of the SNM process to the fast spectrum neutrons will be significantly smaller than that of thermal source but may be less expensive due to the smaller number of components required to interrogate the SNM process relative to the thermal interrogation.

The system fissile content measurement data can be used for closed-loop, fissile content process control and optimization, validation of the criticality safety analysis as well as input to active items relied on for safety. The primary purpose of the measurement is to operate the process within a very tightly controlled fissile content band that assures highly repeatable product quality characteristics and acceptable margin to criticality or to otherwise shutdown the process to maintain licensed margin to criticality. Precise control of process fissile content will increase process yield and also provide early warning of impending erosion of criticality margin prior to the making out-of-specification product and providing time to stabilize the process thereby avoiding a full process shutdown and the related safety challenges associated with actuating items relied on for safety.

Once the neutron pulse has entered the SNM process, there will be a small number of fission events that will produce additional neutrons and gamma rays, both prompt and delayed. These ionizing radiation species will be sampled by strategically placed detectors located strategically around the SNM process. The neutron detectors may include ion chambers coated with either $^{235}$U or $^{10}$B or filled with $^{10}$BF$_3$ or $^3$He. The gamma radiation will be detected using gamma spectroscopy techniques taking input from scintillator detectors including, but not limited to, sodium iodide (NaI) or bismuth germanium oxide (BGO).

The resulting signals will be collected by the process software and correlated to the SNM process variables using pre-calculated sensitivity functions from the Monte-Carlo analysis software use to demonstrate SNM process criticality safety. These sensitivity functions are utilized to determine the real-time K$_{eff}$ of the process and provide input to the process control and protection system to enable precise control of fissile content to maximize process stability and product quality while precluding the potential for process criticality.

The apparatus described herein will be helpful in deploying an inherently safe and production workable facility that can operate SNM processes where moderation control is insufficient to assure criticality safety using bounding analysis assumptions. The ability to gain information as to the real-time process criticality safety by direct measurement of the critical SNM process variables enables maximizing process throughput and simultaneously providing the operator and the criticality safety personnel with online measurement of the current safety state of the process. It is expected that use of the method and apparatus described herein will reduce the capital and operating cost of the SNM process by enabling more realistic process input to the process criticality evaluations. Eliminating the need to consider hyper-conservative process states to implement bounding, off-line criticality analysis is expected to enable lower overall process complexity with simultaneously higher SNM process throughput.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. An apparatus for measuring fissile content in a process for manufacturing fissile materials wherein the process uses a process vessel, the apparatus comprising:
   a neutron generating assembly for generating neutrons;
   a collimating assembly for focusing the neutrons generated in the neutron generating assembly towards the process vessel;
   an interrogation assembly positioned in predetermined locations relative to the process vessel for detecting variables of the process, the variables comprised in use of at least neutron and gamma radiation content or absence thereof; and
   a processor for receiving input about the process variables from the interrogation assembly and for calculating margin to criticality in the process based on the detected variables.

2. The apparatus recited in claim 1 wherein the neutron generating assembly comprises a neutron source capable of being modulated selected from the group consisting of a fusion neutron source capable of being modulated electronically and a fixed neutron source capable of being modulated mechanically.

3. The apparatus recited in claim 2 wherein the fusion neutron source is an accelerator-driven fusion source of one or a combination of deuterium-deuterium or a deuterium tritium fusion reaction.

4. The apparatus recited in claim 2 wherein the neutron source is a fixed source of material that undergoes neutron emitting radioactive decay.

5. The apparatus recited in claim 4 wherein the neutron emitting material is selected from a group consisting of $^{252}$Cf as a spontaneous fission source and ($\alpha$,n) neutron sources consisting of mixtures of beryllium and mixtures of highly active $\alpha$ particle emitters of plutonium, americium, radium and polonium.

6. The apparatus recited in claim 2 wherein the fusion neutron source comprises an ion-beam target made of a material that readily adsorbs hydrogen isotopes within the crystal lattice.

7. The apparatus recited in claim 6 wherein the ion-beam target is made of a material selected from the group consisting of zirconium, titanium, yttrium, and palladium and combinations thereof.

8. The apparatus recited in claim 2 wherein the neutron source pulses an ion beam towards a fusion target.

9. The apparatus recited in claim 8 wherein the ion beam is comprised of ions selected from the group consisting of a deuterium and a tritium.

10. The apparatus recited in claim 9 wherein the deuterium or tritium retained within the target absorb deuterium or tritium ions from the ion beam, undergo nuclear fusion and release neutrons.

11. The apparatus recited in claim 2 wherein the neutron source manipulates a mechanical shutter to shield a fixed neutron source.

12. The apparatus recited in claim 1 wherein the interrogation assembly comprises a plurality of detector arrays positioned in predetermined locations relative to the process vessel.

13. The apparatus recited in claim 12 wherein the detectors are selected from the group consisting of neutron and gamma detectors.

14. The apparatus recited in claim 1 further comprising a moderator assembly positioned between the neutron generating assembly and the collimating assembly for thermally equalizing neutrons generated in the neutron generating assembly.

15. The apparatus recited in claim 14 wherein the moderator is made of a material having an atomic number of 12 or less.

16. The apparatus recited in claim 15 wherein the moderator is made of materials selected from the group consisting of water, heavy water, beryllium, beryllium oxide, graphite, polyethylene, deuterated polyethylene, metal hydrides, metal deuterides and combinations thereof.

17. The apparatus recited in claim 1 wherein the process variables further comprise process parameters for determining criticality of a process selected from the group consisting of temperature, pressure, pH, flow rate, density, fluid level, opacity, moisture, and combinations thereof.

18. The apparatus recited in claim 1 wherein the processor input comprises signals from the interrogation assembly representative of the process variables in real time and the processor correlates the signals to stored models of known process variables to calculate margin to criticality.

19. An apparatus for measuring fissile content in a process for manufacturing fissile materials wherein the process uses process vessel, the apparatus comprising:
a neutron source capable of being modulated;
the neutron source being selected from the group consisting of a mechanically modulated fixed neutron source, an electronically modulated fusion neutron source with a liquid target, and an electronically modulated fusion neutron source with a target formed from a material capable of taking hydrogen into solution, the target being impregnated with one or both of deuterium and tritium;
a collimator for controlling the direction of any neutrons emanating in use from the target;
a plurality of detector arrays positioned in predetermined locations relative to the process vessel for detecting process variables, the detectors producing signals representative of the process variables in real time; and
a processor for receiving the signals and converting the detected process variables into margin to criticality measurements.

20. The apparatus recited in claim 19 further comprising a moderator positioned between the neutron source and the collimator for thermally equalizing neutrons formed in the neutron source.

21. The apparatus recited in claim 20 wherein the moderator is made of materials selected from the group consisting of water, heavy water, beryllium, beryllium oxide, graphite, polyethylene, metal hydrides, metal deuterides, and combinations thereof.

22. The apparatus recited in claim 19 wherein the neutron source includes a target made of a material that readily adsorbs hydrogen isotopes within the crystal lattice.

23. The apparatus recited in claim 22 wherein the target is made of a material selected from the group consisting of zirconium, titanium, yttrium, palladium and combinations thereof.

24. The apparatus recited in claim 19 wherein the detector arrays are selected from the group consisting of neutron and gamma detectors.

25. The apparatus recited in claim 19 wherein the processor correlates the received real time signals to stored models of known process variables to calculate margin to criticality.

26. A method for measuring a margin to criticality in a process for manufacturing fissile materials wherein the process uses process vessel, the method comprising:
pulsing neutrons from a source of neutrons;
collimating the pulsed neutrons towards an array of process variable detectors positioned in predetermined locations relative to the process vessel;
detecting process variables comprised of at least neutron and gamma radiation levels, the detectors producing signals representative of the process variables in real time; and,
sending the real time signals to a processor wherein the processor correlates the signals to stored models of known process variables to calculate margin to criticality.

27. The method recited in claim 26 further comprising moderating the thermal equilibrium of neutrons pulsed from the neutron source before collimating the neutrons.

28. The method recited in claim 26 wherein pulsing the neutrons comprises modulating the fusion neutron source ion beam by intermittently generating an ion beam comprised of one or both of deuterium and tritium and directing the beam to a target formed from a material capable of taking hydrogen into solution, the target being impregnated with one or both of deuterium and tritium, wherein the target emits neutrons.

29. The method recited in claim 26 wherein pulsing the neutrons comprises manipulating a mechanical shutter that is interposed between a fixed source of neutrons and the collimator.

30. The method recited in claim 29 wherein the shutter is manipulated so that it is open or closed to the flow of neutrons from the fixed source into the collimator.

31. The method recited in claim 29 wherein the fixed source of neutrons are selected from a group consisting of $^{252}$Cf as a spontaneous fission source and ($\alpha$,n) neutron sources consisting of mixtures of beryllium and mixtures of highly active α particle emitters of plutonium, americium, radium and polonium.

\* \* \* \* \*